(12) United States Patent
Karve et al.

(10) Patent No.: US 10,817,846 B2
(45) Date of Patent: *Oct. 27, 2020

(54) RESCHEDULING AN ELECTRONIC MEETING

(71) Applicant: International Business Machines Corporation, Armonk, NY (US)

(72) Inventors: Anant D. Karve, Pune (IN); Ajay V. Kulkarni, Pune (IN); Sunanda Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 822 days.

This patent is subject to a terminal disclaimer.

(21) Appl. No.: 14/840,195

(22) Filed: Aug. 31, 2015

(65) Prior Publication Data

US 2017/0061387 A1 Mar. 2, 2017

(51) Int. Cl.
 *G06Q 10/10* (2012.01)
 *G06F 3/0481* (2013.01)
 *G06Q 50/18* (2012.01)

(52) U.S. Cl.
 CPC ....... *G06Q 10/1095* (2013.01); *G06F 3/0481* (2013.01); *G06Q 50/188* (2013.01)

(58) Field of Classification Search
 CPC .................. G06Q 10/063116; G06Q 10/1095
 See application file for complete search history.

(56) References Cited

U.S. PATENT DOCUMENTS

| | | | |
|---|---|---|---|
| 8,375,034 B2 | 2/2013 | Norton et al. |
| 8,463,632 B2 | 6/2013 | Niazi |
| 2005/0102245 A1 | 5/2005 | Edlund et al. |
| 2007/0112926 A1 | 5/2007 | Brett et al. |
| 2013/0085785 A1 | 4/2013 | Rogers et al. |
| 2014/0200940 A1 | 7/2014 | Putterman et al. |

OTHER PUBLICATIONS

Sharon Profis, How to find mutual meeting times with Doodle, Jan. 26, 2012.*
NewTime (Year: 2015).*
Holmes (Year: 2014).*
Gresham, https://www.idownloadblog.com/2012/07/20/doodle-easy-schedule/ (Year: 2012).*
Jill Duffy, "The 9 Best Meeting Scheduler Apps and Tools in 2019" (Year: 2019).*
IBM: List of IBM Patents or Patent Applications Treated as Related (Appendix P), Jul. 27, 2016, pp. 1-2.
Karve et al., U.S. Appl. No. 15/220,605, filed Jul. 27, 2016, titled "Rescheduling an Electronic Meeting," pp. 1-27.
(Continued)

*Primary Examiner* — Aryan E Weisenfeld
(74) *Attorney, Agent, or Firm* — L. Jeffrey Kelly (57) ABSTRACT

A computer-implemented method for effective electronic meeting rescheduling under which time information for a meeting information is received. Invitees to the meeting is identified. An earliest counter time slot for the said meeting is identified. A first set of metadata for the earliest counter time slot is created. A latest counter time slot for said meeting is identified. A second set of metadata for the latest counter time slot is created. Furthermore, the first and second set of metadata to the invitees are sent.

18 Claims, 5 Drawing Sheets

(56) References Cited

OTHER PUBLICATIONS

Hossain et al., "A Deliberative Agent for Meeting Scheduling", 2013 IEEE 27th International Conference on Advanced Information Networking and Applications, pp. 732-739.
Antila et al., "Optimizing Meeting Scheduling in Collaborative Mobile Systems through Distributed Voting", 2010 IEEE, pp. 228-243.
https://help.doodle.com/hc/en-us/articles/360012150113-What-is-Doodle-and-how-does-it-work-an-introduction, "What is Doodle and how does it work: an introduction", Accessed on Sep. 26, 2019, 6 pages.

* cited by examiner

RESCHEDULING AN ELECTRONIC MEETING

BACKGROUND

The present disclosure relates generally to the field of computer systems, and more particularly to rescheduling electronic meetings.

In most organizations, employees use personal information management systems (hereafter referred to as "PIM") to coordinate and schedule meetings. PIM generally refers to the practice and the study of the activities people perform in order to acquire, organize, maintain, retrieve and use personal information items, such as, documents (paper-based and digital), web pages and email messages for everyday use to complete tasks and fulfill a person's various roles. Users rely on PIM for scheduling of meetings, appointments and events. Typically, E-mails, calendars and contacts are the three main uses of this system.

Coordinating a meeting among busy professionals can be a challenge due to multiple counterproposals for date/time of the meeting. For instance, different people may have different preferences for date/time of a meeting and those counterproposals may differ vastly.

SUMMARY

The present disclosure implements a system, method, and computer program product which effectively reschedules electronic meetings.

An embodiment of the present disclosure provides a method for effective rescheduling of an electronic meeting. The method includes receiving meeting information and a counterproposal threshold from a user, where, the counterproposal threshold limits the number of counter proposals for the meeting. The method includes identifying a plurality of invitees for transmitting the meeting information, for a scheduled meeting request. The method includes receiving counter proposals from the plurality of invitees, based on the received meeting information. The method includes identifying an earliest counter time slot for the meeting, where the earliest counter time slot is the soonest possible time the invitee attends the meeting. The method includes identifying a latest counter time slot for said meeting, where the latest counter time slot is the latest possible time the invitees attends the meeting. The method includes creating a negotiation range based on the earliest and the latest counter time slots, for attending the meeting. The method further includes generating a dashboard comprising the negotiation range and an option to counter propose within the negotiation range.

Another embodiment of the present disclosure provides a computer system for effective rescheduling of an electronic meeting. An embodiment of the present disclosure provides a computer system for effective rescheduling of an electronic meeting. The computer system includes receiving meeting information and a counterproposal threshold from a user, where, the counterproposal threshold limits the number of counter proposals for the meeting. The computer system includes identifying a plurality of invitees for transmitting the meeting information, for a scheduled meeting request. The computer system includes receiving counter proposals from the plurality of invitees, based on the received meeting information. The computer system includes identifying an earliest counter time slot for the meeting, where the earliest counter time slot is the soonest possible time the invitee attends the meeting. The computer system includes identifying a latest counter time slot for said meeting, where the latest counter time slot is the latest possible time the invitees attends the meeting. The computer system includes creating a negotiation range based on the earliest and the latest counter time slots, for attending the meeting. The computer system further includes generating a dashboard comprising the negotiation range and an option to counter propose within the negotiation range.

Another embodiment of the present disclosure provides a computer program product for effective rescheduling of an electronic meeting. An embodiment of the present disclosure provides a computer program product for effective rescheduling of an electronic meeting. The computer program product includes receiving meeting information and a counterproposal threshold from a user, where, the counterproposal threshold limits the number of counter proposals for the meeting. The computer program product includes identifying a plurality of invitees for transmitting the meeting information, for a scheduled meeting request. The computer program product includes receiving counter proposals from the plurality of invitees, based on the received meeting information. The computer program product includes identifying an earliest counter time slot for the meeting, where the earliest counter time slot is the soonest possible time the invitee attends the meeting. The computer program product includes identifying a latest counter time slot for said meeting, where the latest counter time slot is the latest possible time the invitees attends the meeting. The computer program product includes creating a negotiation range based on the earliest and the latest counter time slots, for attending the meeting. The computer program product further includes generating a dashboard comprising the negotiation range and an option to counter propose within the negotiation range.

DETAILED DESCRIPTION

Figure 1A:
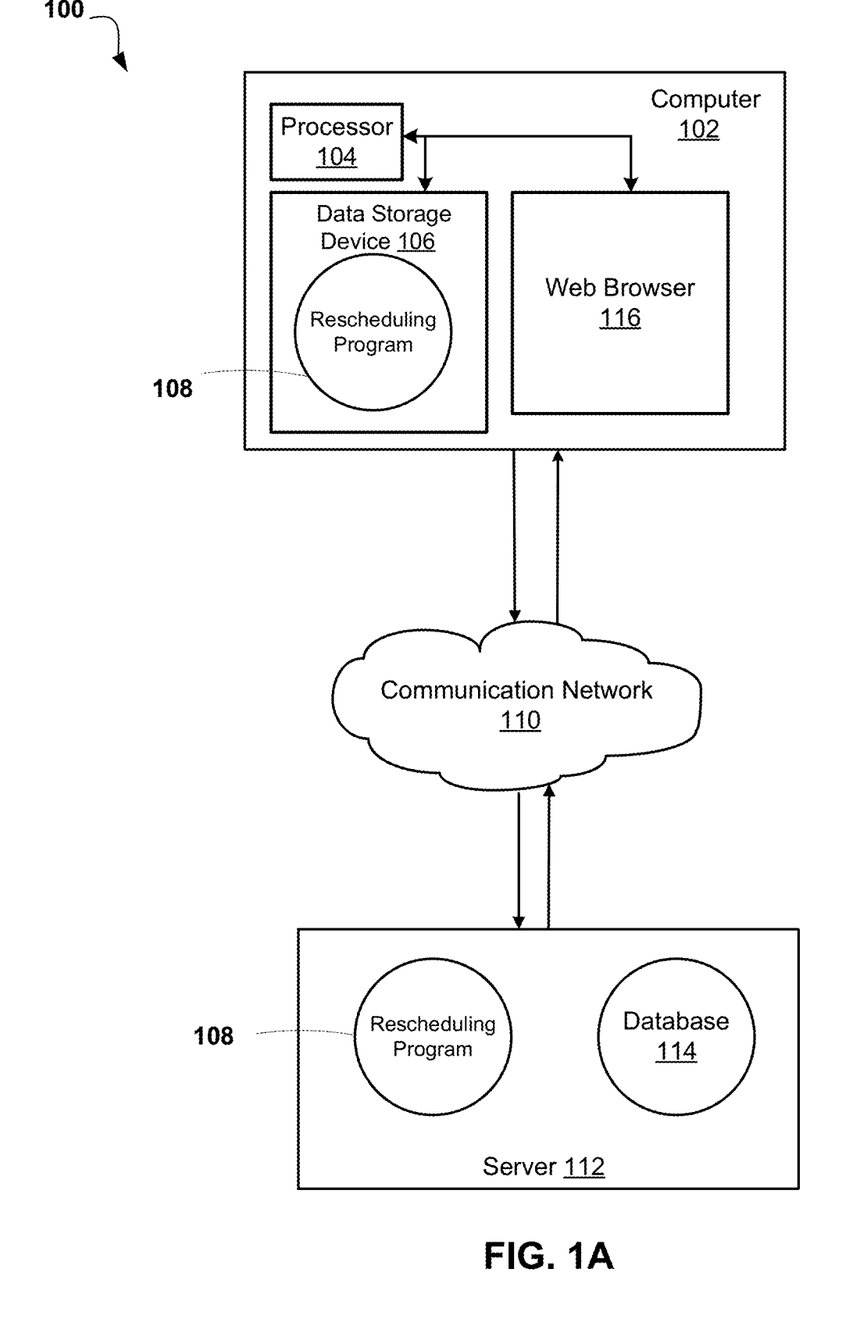
FIG. 1A is schematic block diagram depicting a computing environment for a rescheduling program, according to embodiments of the present invention.

FIG. 1A depicts an exemplary computing environment 100 for managing the display of application forms within a web-based application. In various embodiments of the present invention, the environment 100 may include a computer 102 and server 112 connected over communication network 110.

A computer 102 may include a processor 104 and a data storage device 106 that is enabled to run a rescheduling program 108 and a web browser 116 that displays an application form. Non-limiting examples of a web browser may include: Firefox®, Explorer®, or any other web browser. All brand names and/or trademarks used herein are the property of their respective owners. It must be mentioned that the present disclosure is not limited to web browsers and may also be implemented in conjunction with any web application.

A networked computer environment 100 may also include a server 112 with a database 114. The server 112 may be enabled to run a program such a rescheduling program 108. A communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with the server 112 via the communication network 110. The communication network 110 may include connections, such as wire, wireless communication links, or fiber optic cables.

The computer 102 and the server 112 may be, for example, a mobile device, a telephone, a personal digital assistant, a netbook, a laptop computer, a tablet computer, a desktop computer, or any type of computing device capable of running a program and accessing a network. A program, such as a rescheduling program 108 may run on the client computer 102 or on the server 112. It should be appreciated that rescheduling program 108 has the same component and operation methods regardless of whether it is run on the server 112 or computer 102. Therefore, rescheduling program 108 applies to both a rescheduling program 108 run on a computer 102 and rescheduling program 108 run on the server 112 interchangeably.

Figure 1B:
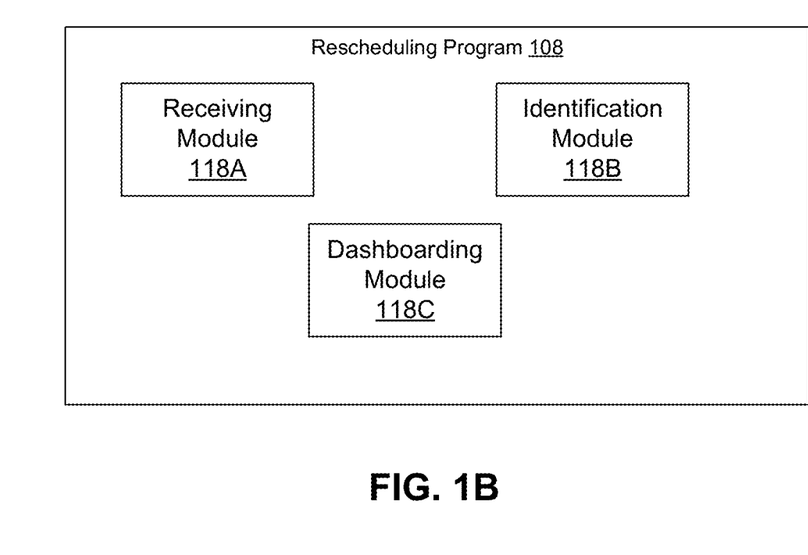
FIG. 1B is as schematic block diagram depicting components of a rescheduling program, according to embodiments of the present invention.

Referring now to FIG. 1B, a rescheduling program 108 may include a receiving module 118A, identification module 118B, dashboarding module 118C. Receiving module 118A may receive meeting information including time and date of a meeting and a threshold from a chair. A threshold is a determined threshold of the number of counterproposals which has allowed for the meeting. Identification module 118B may identify the participants to the meeting. Participants in this disclosure may be chair and invitee of the meeting.

Chair is a person who creates the meeting and identify the invitees to the meeting. Invitees are people whom Chair has designated as required to attend the meeting. Identification module 118B may also receive counterproposals of the meetings from invitees of the meeting. Identification module 118B may check and see if the threshold is reached. If the threshold is reached, dashboarding module 118C may generate a negotiation range. A negotiation range is a time range which includes the meeting date/time and all the counterpropals. Dashboarding module 118C may achieve this by determining the earliest and latest possible times for the meeting. Dashboarding module 118C may also generate a dashboard which displays the meeting times and the range in order to culminate in the participants of the meeting to choose an appropriate time.

Figure 2:
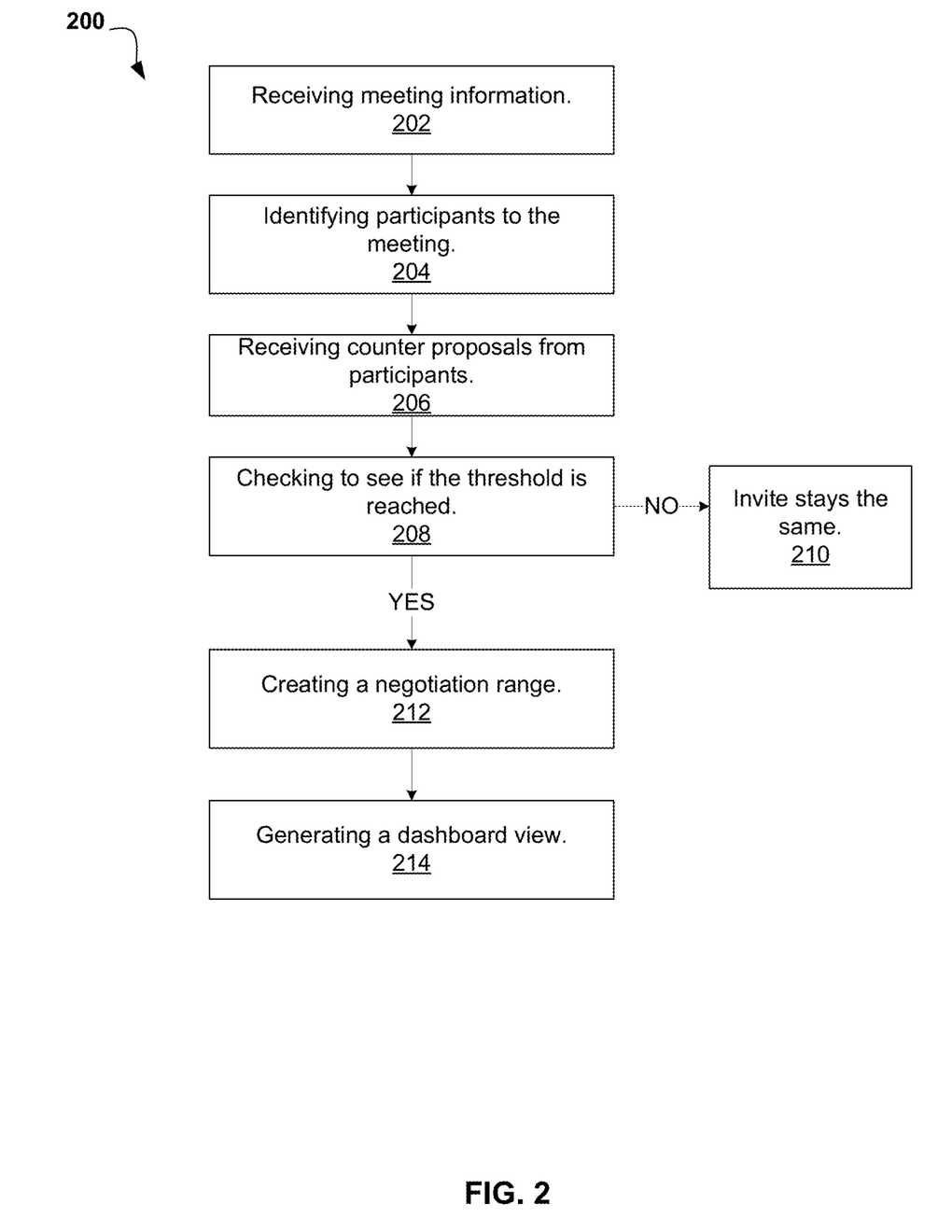
FIG. 2 is a flowchart depicting operational steps of a method 200 for a rescheduling program, according to embodiments of the present invention.
Figure 3A:
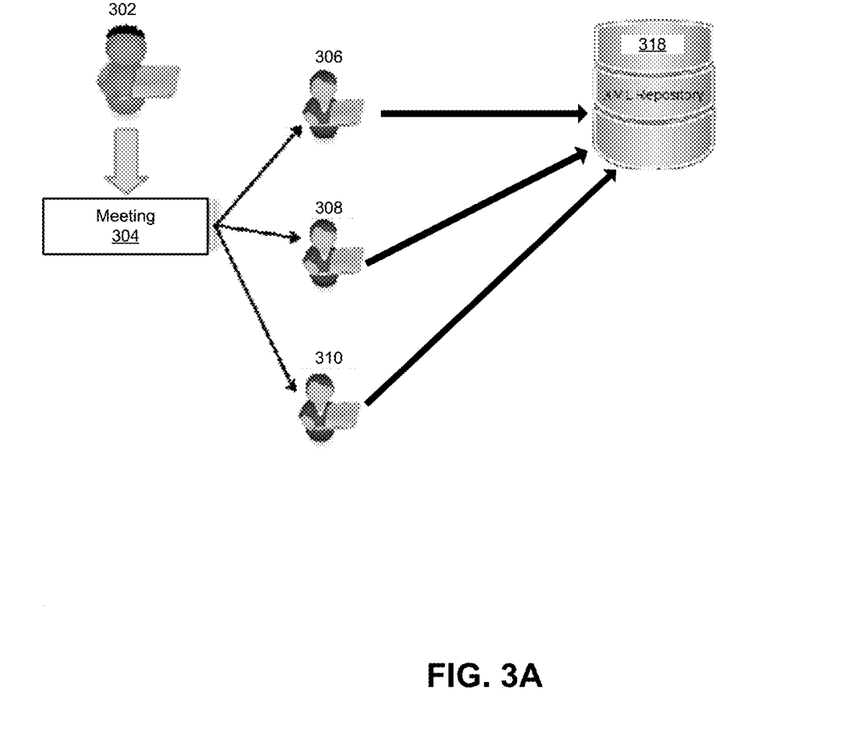
FIG. 3A is a schematic block diagram depicting an electronic meeting rescheduling, according to embodiments of the present invention.
Figure 3B:
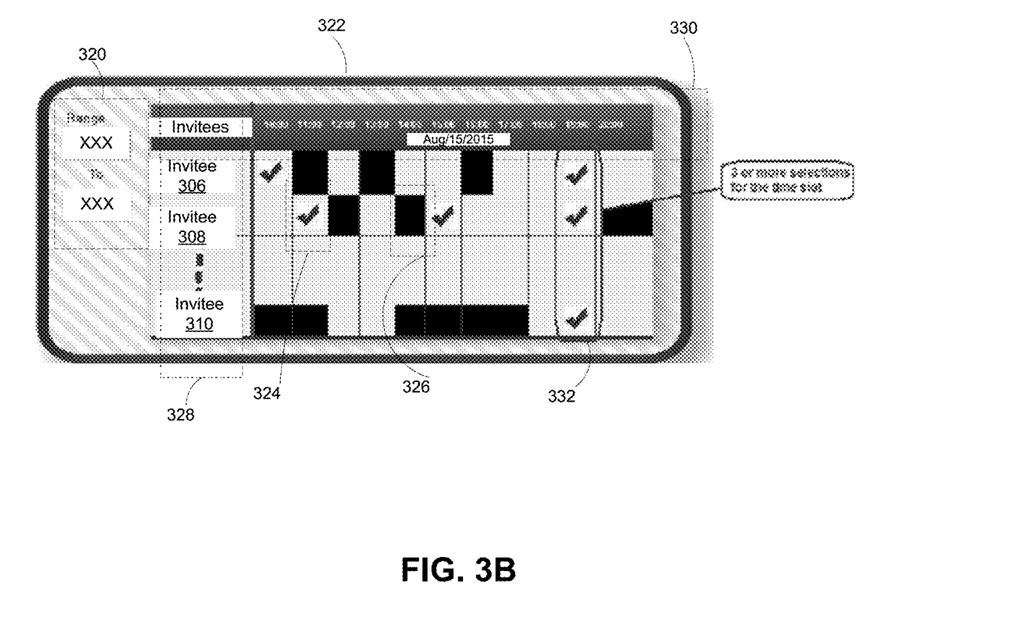
FIG. 3B is a schematic block diagram depicting a dashboard, according to embodiments of the present invention.

FIG. 2 is a flowchart which in conjunction with FIG. 3A-B depicts operational steps of a method 200 for a rescheduling program, in accordance with an embodiment of the present disclosure. Steps of method 200 may be implemented using one or more modules of a computer program such as rescheduling program 108, and executed by a processor of a computer, such as computer 102.

It should be appreciated that FIG. 2 does not imply any limitations with regard to the environments or embodiments which may be implemented. Many modifications to the depicted environment or embodiment shown in FIG. 2 may be made. FIG. 3 depicts an embodiment of the present disclosure. In this embodiment, a schedule conflict is resolved.

Referring now to 202, receiving module 118A may receive meeting information regarding a meeting. Receiving module 118A may receive a digital text stream comprising one or more words, and/or corresponding metadata, from an electronic input source. Receiving module 118A may receive the information from a user or a computer implemented system. Non-limiting examples of an input source may be spoken words, typed words, or inputting a corpus electronically from a computer implemented source such as an electronic device (e.g. cell phones or tablets).

In an embodiment, a user may create a meeting invite, and input the information regarding that meeting such as name of the invitees, time and date of the meeting, place of the meeting etc. For the purposes of this disclosure the user who creates the meeting invite is hereafter known as "the chair" or "Chair" and the invitees whom the chair has invited to the meeting are hereafter referred to as "invitee" or "invitees". Chair may also have knowledge that some invitees may not be available during this proposed meeting time therefore chair may set a threshold of counter proposals in the meeting invite. A counter proposal is an alternative proposal made in response to an original meeting (which Chair has created) that is regarded as unacceptable or unsatisfactory. Simply put, an invitee may propose another time/date for a meeting and the second proposal may differ from the original time/date which Chair has indicated. Furthermore, a threshold of counter proposal may be set by Chair and limits the number of counter proposals to a meeting. Threshold of counter proposal may be an individual number (e.g. Chair will not accept more than 1 counter proposal from each invitee), or a total number (e.g. Chair will not accept more than 5 total overall proposals from all invitees combined), or a rate of proposals. A rate proposal is a percentage set by Chair which indicates the threshold by dividing the number of counter proposals by the number of invitees. For example a threshold of counter proposal of 40% indicates that:

(Numberofcounterproposals)<0.40

(Number of invitees)

In this example, if the number of invitees is set as 10 invitees, then the threshold of counterproposals is set as 4 total counter proposals from all invitees.

In the present embodiment, and illustrated in FIG. 3A, Chair 302 sets a meeting 304 for August 15$^{th}$, at 10:00 am to 11:00 am with a 40% threshold of counterproposal. Chair 302, in the present embodiment, directly inputs the meeting information for meeting 304 in a user interface of a rescheduling program 108.

At 204, the identification module 118B may identify the invitees to the meeting set by Chair. Identification module 118B may identify the invitees as Chair has indicated them. In another embodiment, identification module 118B may identify the invitees using metadata received by the receiving module 118A. In the present embodiment, identification module 118B identifies invitees 306, 308, and 310 as three invitees of meeting 304 as they are indicated by Chair 302.

At 206, the identification module 118B may receive counterproposals from invitees. Identification module 118B may receive these counter proposals directly from the invitee as invitees may send a counterproposal through an interface provided by rescheduling program 108. In other embodiments, identification module 118B may receive counterproposals from a computer implemented program such as another meeting or organizing software or mobile application. In an embodiment, the counterproposals are transformed into metadata or other data structures. In that embodiment, the metadata or other data structure is stored in a repository such as XML repository 318. Extensible Markup Language (XML) is a markup language that defines a set of rules for encoding documents in a format which is both human-readable and machine-readable. It must be appreciated that metadata or data may be saved in other formats and XML is merely an embodiment.

In the present embodiment, invitees 306, 308, and 310 directly input their counter proposals into the user interface of the rescheduling program 108. In the present embodiment, meeting date and time from the original invite is 15th August, 10:00 a.m. to 11:00 a.m. and there are 3 counters:

Counter proposal by Invitee 306: $14^{th}$ of August, 10:00 a.m. to 11:00 a.m.

Counter proposal by Invitee 308: $17^{th}$ of August, 11:30 a.m. to 12:30 p.m.

Counter proposal by Invitee 310: $20^{th}$ of August, 4:00 p.m. to 5:00 p.m.

The elements of this analysis are stored in an XML repository 318. In the present embodiment, the XML is created per meeting instance that is to be analyzed. All such XML's for a user are stored in a temporary location where the user's mail and calendar data is located (This can be a hard drive on user's computer or a remote location for web-based or cloud-based email programs).

At 208, identification module 118B may determine whether the threshold of counterproposal has been met. Identification module 118B may, in one embodiment, using the number of invitees (indicated by the receiving module 118A and number of counter proposals received (at step 206), may calculate a ratio according to the following formula:

$$\frac{(\text{Number of counterproposals})}{(\text{Number of invitees})}$$

Identification module 118B may use that ratio, in that embodiment, in order to determine whether the threshold of counterproposals has been satisfied.

In the present embodiment, identification module 118B determines that the threshold has been met. The threshold has been identified as 40% (which was received by the receiving module 118A). A 40% threshold of counterproposal indicates that for a meeting with 3 invitees there is a limit of 2 counter proposals. In the present embodiment, identification module 118B receives 3 counter proposals and therefore determines that the threshold of counter proposal has been satisfied.

It should be mentioned that if the threshold of counter proposal is not satisfied, the invitation may remain the same. In other words if not enough invitees propose new date/times for the meeting, identification module 118B may determine that the meeting as originally indicated by Chair is acceptable and therefore the meeting information may remain the same as original (step 210).

At 212, dashboarding module 118C, determines a negotiation range. A negotiation range is a time range which includes the meeting date/time and all the counterpropals. For example a negotiation range spans between the earliest date/time of the meeting and all the counterproposals received and the latest of said information. In other words dashboarding module 118c may use the earliest counter date/time slot and latest counter date/time slot to define the negotiation range. It should be mentioned that in one embodiment of this invention, Chair may override the range or preset the acceptable negotiation range when creating the original meeting. In said embodiment, dashboarding module 118C use the pre-determined negotiation range.

In the present embodiment, dashboarding module 118C determines negotiation range 320. Negotiation range 320 spans between $14^{th}$ of August, at 10:00 a.m. to $20^{th}$ of August, at 5:00 p.m. The contents of the XML in this embodiment are as follows:

Earliest and latest time slot in the counter proposals—

Earliest time and date—14th August, 10:00 a.m. To 11:00 a.m.

Latest time and date—20th August, 4:00 p.m. To 5:00 p.m.

This now becomes the "negotiation range" and therefore the XML representation is the following:

<broadrange><start>Aug14,10</start><end>Aug20,17</end></broadrange>

At 214, dashboarding module 118C, generates a user interface for the Chair and Invitees in order to resolve the scheduling conflict. Dashboard is a user interface visible to chair & all Invitees for collaborative approach to conflict resolution which may allow the invitees to mark multiple proposed counter time slots. Dashboard may further show the original meeting schedule date/time slot along with all counter slots as well as free/busy data for chair & all invitees. Invitees may edit the dashboard and mark one or more preferred time slot(s) on Dashboard. More specifically, invitees may add more counter proposals or free up their calendar to accommodate this meeting by looking at other's availability/counters on the Dashboard. The Dashboard may continue to auto-update based on every action taken by Chair and/or Invitees.

The dashboard may contain an editable table control listed with the invitees and their corresponding time slots in a row. The table control may have one row for each invitee. The time slots may be selected individually or by group of invitees. The time slot which was selected by the invitee while originally countering the invite may be shown by the "tick-mark" sign in the table control. The dashboard may also contain the scheduling information that is made available from the metadata XML. The time slots where the invitee is busy may be shown as blacked out or unavailable. Other time slots which are designated as free may be selected.

As shown in the FIG. 3B, dashboard 322 contains the basic elements that are present in the metadata XML as described above and displays the permissible broader range of the meeting reschedule which comes automatically populated from the metadata XML. The negotiation range is displayed at box 320. This display allows Chair and Invitees to understand the inner and outer limits of the proposals and counter proposals of the meeting. Dashboard 322 allows Chair to manually edit the range, or choose to have it, as is populated. Dashboard 322, which is visible to all participants of the meeting (i.e. Chair and Invitees), comprises of column 328 and row 330. In the present embodiment, column 328 represents the invitees (i.e. invitees 306, 308, and 310). Row 330 represents different time and dates. It must be mentioned that the date/time represented at row 330 may be customized to show other time/dates and dashboard 322 will customize and update the information according to the displayed date/time range. Dashboard 322, is displaying a time range of 10 am to 8 pm (or 20:00). Every slot within dashboard 322 correspond to an invitee and a date/time information. For example slot 324 represents information regarding invitee 308 at 11:00 am on Aug. 15, 2015.

In the present embodiment and reflected in dashboard 322, a slot maybe checked or blacked out. A blacked out slot (i.e. slot 326) means that the invitee is busy or unavailable during that time slot. On the contrary, when a slot is checked (i.e. slot 324) the invitee is available. In the present embodiment, Chair views the dashboard and find an appropriate time slot for all invitees. Chair find time slots 332 which reflects Aug. 15, 2015 at 15:00 (3:00 pm) and reschedules the meeting to said time.

In another embodiment, Chair and user may not agree on a time slot to have a meeting even after dashboard has determined the appropriate range. In that embodiment, dashboard may select a pre-determined number of counterproposals closest (in time and date to the original meeting time) and suggest to the chair and/or Invitees the selected counterproposals.

In yet another embodiment, the dashboard may have an expiration time. This expiration time ensures that invitees respond to the dashboard requests before the dashboard is expired. The expiration time (which may include a particular date/time or may be set on a duration) may be a preset value or may be modified by Chair. In that embodiment, Invitees must mark their preferences within the expiration time. In case none of the invitee marks their preferred time slots, the slot closest to the original time will be chosen and the reschedule notice will be prepared accordingly.

Figure 4:
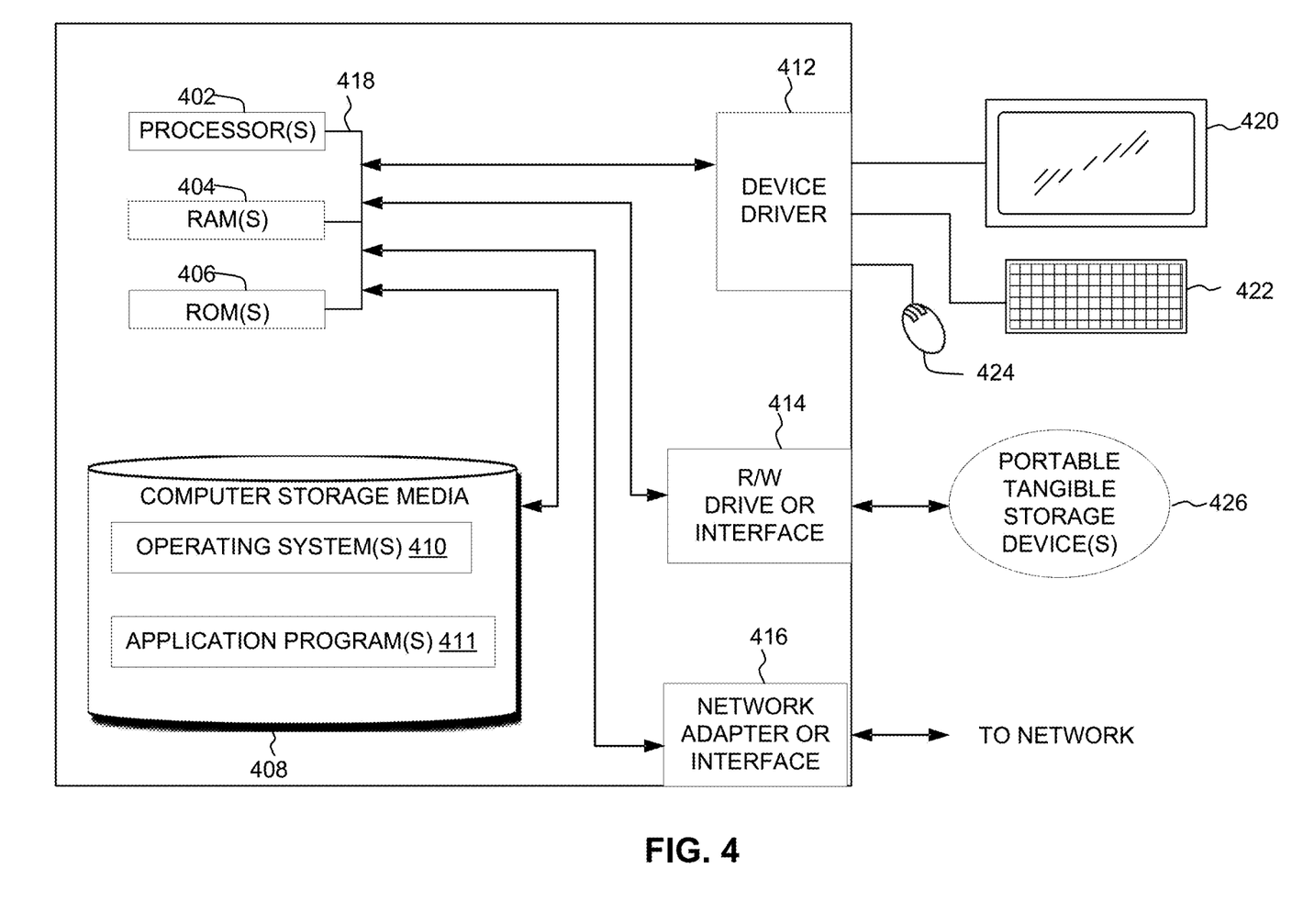
FIG. 4 is a block diagram of internal and external components of computers and servers depicted in FIG. 1, according to embodiments of the present invention.

Referring now to FIG. 4 of components a computer system, for example server 112 and data source 120, of distributed data processing environment 100 of FIG. 1, in accordance with an embodiment of the present disclosure.

Server 112 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 514 and loaded into the respective computer readable storage media 508.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present disclosure. Therefore, the present disclosure has been disclosed by way of example and not limitation.

The invention claimed is:

1. A computer system for rescheduling an meeting, the computer system comprising:
   one or more computer processors;
   one or more computer-readable storage media;
   an interface for centralized data exchange between users; and
   program instructions stored on the computer-readable storage media for execution by at least one of the one or more processors, the program instructions comprising:
      instructions to receive, by the one or more processors via the interface, meeting information and a counterproposal threshold from a user, wherein the meeting information comprises name(s) of invitees, a time and date for the meeting, and a location for the meeting, and the counterproposal threshold limits a number of counterproposals for the meeting;
      instructions to identify, by the one or more processors, the invitees from the meeting information, for a scheduled meeting request;
      instructions to receive, by the one or more processors via the interface, counterproposals from the invitees, based on the received meeting information, wherein the received counterproposals comprise one or more time slots proposed by one or more of the invitees that differ from the scheduled meeting request;

instructions to convert, by the one or more processors, the received counterproposals into machine-readable data;

instructions to identify, by the one or more processors, from the converted machine-readable data, an earliest counter time slot for the meeting, wherein the earliest counter time slot is a soonest possible time the invitees attend the meeting;

instructions to identify, by the one or more processors, from the converted machine-readable data, a latest counter time slot for the meeting, wherein the latest counter time slot is a latest possible time the invitees attend the meeting;

instructions to automatically generate, by the one or more processors, in response to receiving a number of counterproposals exceeding the counterproposal threshold, a dashboard accessible to the user and all invitees via the interface, the generated dashboard comprising a negotiation range based on the earliest and latest time slots for the received counterproposals, the dashboard comprising a plurality of discrete, selectable times proposed by one or more of the invitees in the received counterproposals;

instructions to receive, by the one or more processors from one or more invitees via the generated dashboard, a selection of a time slot from among the time slots indicated on the generated dashboard; and instructions to receive, by the one or more processors from the user via the generated dashboard, a selection of a new time slot from among the time slots indicated on the generated dashboard.

2. The computer system of claim 1, wherein the generated dashboard including the negotiation range and all the time slots proposed by one or more of the invitees in the received counterproposals is visible to all invitees.

3. The computer system of claim 1, wherein the counterproposal threshold defined by the user is a percentage of the total number of invitees.

4. The computer system of claim 1, wherein the generated dashboard has an expiration time.

5. The computer system of claim 1, further comprising:
instructions to select, by the one or more processors, a pre-determined number of counterproposals from among the received counterproposals, wherein the selected counterproposals are closest in time and date to the meeting; and
instructions to present, by the one or more processors, the selected counterproposals to the user.

6. The computer system of claim 1,
instructions to receive, by the one or more processors via the generated dashboard, additional counterproposals from one or more of the invitees, the additional counterproposals comprising one or more time slots identified by the generated dashboard and within the negotiation range; and
instructions to modify, by the one or more processors, the dashboard to include the additional counterproposals.

7. A computer system for rescheduling an electronic meeting, the computer system comprising:
one or more computer processors;
one or more computer-readable storage media;
an interface for centralized data exchange between users; and
program instructions stored on the computer-readable storage media for execution by at least one of the one or more processors, the program instructions comprising:

instructions to receive, by the one or more processors via the interface, meeting information and a counterproposal threshold from a meeting chair for the electronic meeting, wherein the meeting information comprises name(s) of meeting invitees, a scheduled day/time slot for the electronic meeting, and a location for the electronic meeting, and the counterproposal threshold defines a maximum number of counterproposals considered by the meeting chair;

instructions to receive, by the one or more processors via the interface, counterproposals from meeting invitees based on the received meeting information, wherein the received counterproposals comprise one or more day/time slots proposed by the meeting invitees that differ from the scheduled day/time slot for the electronic meeting;

instructions to identify, by the one or more processors, the day/time slot of an earliest counterproposal for the electronic meeting, wherein the day/time slot of the earliest counterproposal is a soonest possible day/time slot proposed by the meeting invitees;

instructions to identify, by the one or more processors, the day/time slot of a latest counterproposal for the electronic meeting, wherein the day/time slot of the latest counterproposal is a latest possible day/time slot proposed by the meeting invitees;

in response to receiving a number of counterproposals exceeding the counterproposal threshold, instructions to automatically generate, by the one or more processors, a dashboard user interface accessible to the meeting chair and all meeting invitees via the interface, the dashboard user interface indicates the scheduled day/time slot for the electronic meeting, a negotiation range, the day/time slots of all the counterproposals submitted by the meeting invitees, and an availability of both the meeting chair and all the meeting invitees for each day/time slot indicated on the dashboard user interface, and wherein the negotiation range is a time range which includes the scheduled day/time slot for the electronic meeting and the day/time slots of all the counterproposals, wherein the time range begins with the day/time slot of the earliest counterproposal and ends with the day/time slot of the latest counterproposal; and instructions to receive, by the one or more processors from the meeting chair via the dashboard user interface, a new day/time slot from among the day/time slots indicated on the dashboard user interface.

8. The computer system of claim 7, further comprising:
instructions to receive, by the one or more processors via the dashboard user interface, additional counterproposals from one or more of the meeting invitees, the additional counterproposals comprising one or more day/time slots identified by the dashboard user interface and within the negotiation range.

9. The computer system of claim 7, further comprising:
instructions to receive, by the one or more processors via the dashboard user interface, additional counterproposals from one or more of the meeting invitees, the additional counterproposals comprising one or more day/time slots identified by the dashboard user interface and within the negotiation range; and
instructions to modify, by the one or more processors, the dashboard user interface to include the additional counterproposals.

10. The computer system of claim 7, wherein the counterproposal threshold defined by the meeting chair is a percentage of the total number of meeting invitees.

11. The computer system of claim 7, wherein the dashboard user interface has an expiration time.

12. The computer system of claim 7, further comprising:
instructions to select, by the one or more processors, a pre-determined number of counterproposals from among the received counterproposals, wherein the day/time slots of the selected counterproposals are closest in time to the scheduled day/time slot of the electronic meeting; and
instructions to modify, by the one or more processors, the dashboard user interface to include the selected counterproposals.

13. A computer system for rescheduling an electronic meeting, the computer system comprising:
one or more computer processors;
one or more computer-readable storage media;
an interface for centralized data exchange between users; and
program instructions stored on the computer-readable storage media for execution by at least one of the one or more processors, the program instructions comprising:
instructions to receive, by the one or more processors via the interface, meeting information and a counterproposal threshold from a meeting chair for the electronic meeting, wherein the meeting information comprises name(s) of meeting invitees, a scheduled day/time slot for the electronic meeting, and a location for the electronic meeting, and the counterproposal threshold defines a maximum number of counterproposals considered by the meeting chair;
instructions to identify, by the one or more processors, meeting invitees based on whom the meeting chair invited to the electronic meeting;
instructions to receive, by the one or more processors via the interface, counterproposals from the meeting invitees based on the received meeting information, wherein the received counterproposals comprise one or more day/time slots proposed by one or more of the meeting invitees that differ from the scheduled day/time slot for the electronic meeting;
instructions to convert, by the one or more processors, the received counterproposals into machine-readable data;
instructions to identify, by the one or more processors from the converted machine-readable data, the day/time slot of an earliest counterproposal for the electronic meeting, wherein the day/time slot of the earliest counterproposal is a soonest possible day/time slot proposed by the meeting invitees;
instructions to identify, by the one or more processors from the converted machine-readable data, the day/time slot of a latest counterproposal for the electronic meeting, wherein the day/time slot of the latest counterproposal is a latest possible day/time slot proposed by the meeting invitees;
instructions to automatically generate, by the one or more processors, in response to receiving a number of counterproposals exceeding the counterproposal threshold, a dashboard user interface comprising a negotiation range based on the earliest and the latest day/time slots for the received counterproposals, the dashboard user interface being accessible to the meeting chair and all meeting invitees via the interface and indicating the scheduled day/time slot for the electronic meeting, the negotiation range, the day/time slots of all the counterproposals submitted by the meeting invitees, and an availability of both the meeting chair and all the meeting invitees for each day/time slot indicated on the dashboard user interface; and
instructions to receive, by the one or more processors from the meeting chair via the dashboard user interface, a new day/time slot from among the day/time slots indicated on the dashboard user interface.

14. The computer system of claim 13, further comprising:
instructions to receive, by the one or more processors via the dashboard user interface, additional counterproposals from one or more of the meeting invitees, the additional counterproposals comprising one or more day/time slots identified by the dashboard user interface and within the negotiation range.

15. The computer system of claim 13, further comprising:
instructions to receive, by the one or more processors via the dashboard user interface, additional counterproposals from one or more of the meeting invitees, the additional counterproposals comprising one or more day/time slots identified by the dashboard user interface and within the negotiation range; and
instructions to modify, by the one or more processors, the dashboard user interface to include the additional counterproposals.

16. The computer system of claim 13, wherein the counterproposal threshold defined by the meeting chair is a percentage of the total number of meeting invitees.

17. The computer system of claim 13, wherein the dashboard user interface has an expiration time.

18. The computer system of claim 13, further comprising:
instructions to select, by the one or more processors, a pre-determined number of counterproposals from among the received counterproposals, wherein the day/time slots of the selected counterproposals are closest in time to the scheduled day/time slot of the electronic meeting; and
instructions to modify, by the one or more processors, the dashboard user interface to include the selected counterproposals.

* * * * *